(12) United States Patent
Kim et al.

(10) Patent No.: US 10,796,106 B2
(45) Date of Patent: Oct. 6, 2020

(54) APPARATUS AND METHOD FOR SELECTING SPEAKER BY USING SMART GLASSES

(71) Applicant: Electronics and Telecommunications Research Institute, Daejeon (KR)

(72) Inventors: Dong Hyun Kim, Seoul (KR); Young Jik Lee, Daejeon (KR); Sang Hun Kim, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 32 days.

(21) Appl. No.: 16/114,388

(22) Filed: Aug. 28, 2018

(65) Prior Publication Data

US 2019/0188265 A1 Jun. 20, 2019

(30) Foreign Application Priority Data

Dec. 14, 2017 (KR) .................... 10-2017-0172442

(51) Int. Cl.
*G06F 40/58* (2020.01)
*G10L 13/033* (2013.01)
*G02B 27/01* (2006.01)
*G10L 13/04* (2013.01)

(52) U.S. Cl.
CPC ........... *G06F 40/58* (2020.01); *G02B 27/017* (2013.01); *G10L 13/033* (2013.01); *G10L 13/043* (2013.01)

(58) Field of Classification Search
CPC combination set(s) only.
See application file for complete search history.

(56) References Cited

U.S. PATENT DOCUMENTS

| 7,372,032 | B1 * | 5/2008 | Laing | G01T 1/11 250/337 |
| 9,804,757 | B2 * | 10/2017 | Hilbrink | G06F 3/0484 |
| 2006/0285748 | A1 * | 12/2006 | Tateno | G06F 17/275 382/181 |
| 2014/0369570 | A1 * | 12/2014 | Cheikh | G06K 5/00 382/116 |
| 2015/0042747 | A1 * | 2/2015 | Won | H04N 7/147 348/14.05 |

(Continued)

FOREIGN PATENT DOCUMENTS

JP 2012-59121 3/2012
JP 2012059121 A * 3/2012

*Primary Examiner* — Linda Wong
(74) *Attorney, Agent, or Firm* — Kile Park Reed & Houtteman PLLC

(57) ABSTRACT

Provided are an apparatus and method for selecting a speaker by using smart glasses. The apparatus includes a camera configured to capture a front angle video of a user and track guest interpretation interlocutors in the captured video, smart glasses configured to display a virtual space map image including the guest interpretation interlocutors tracked through the camera, a gaze-tracking camera configured to select a target person for interpretation by tracking a gaze of the user so that a guest interpretation interlocutor displayed in the video may be selected, and an interpretation target processor configured to provide an interpretation service in connection with the target person selected through the gaze-tracking camera.

14 Claims, 9 Drawing Sheets

(56) References Cited

U.S. PATENT DOCUMENTS

| | | | |
|---|---|---|---|
| 2015/0279117 A1* | 10/2015 | Schimke | G06F 16/00 |
| | | | 345/633 |
| 2016/0210283 A1 | 7/2016 | Kim et al. | |
| 2016/0328391 A1 | 11/2016 | Choi et al. | |
| 2017/0041309 A1* | 2/2017 | Ekambaram | G06F 21/44 |
| 2017/0068959 A1* | 3/2017 | Kwak | G06Q 20/20 |
| 2017/0242480 A1* | 8/2017 | Dees | G06K 9/00671 |
| 2017/0243519 A1* | 8/2017 | Teshima | G10L 15/26 |
| 2017/0264608 A1* | 9/2017 | Moore | H04W 12/06 |
| 2017/0270285 A1* | 9/2017 | Spence | G06F 21/32 |
| 2017/0286058 A1* | 10/2017 | Kim | G06F 3/04817 |
| 2018/0048640 A1* | 2/2018 | Johansson | H04W 12/0608 |
| 2018/0120594 A1* | 5/2018 | Li | G06F 3/011 |
| 2018/0262505 A1* | 9/2018 | Ligatti | G06F 21/6281 |
| 2019/0324634 A1* | 10/2019 | Gao | G06F 3/04815 |

\* cited by examiner

APPARATUS AND METHOD FOR SELECTING SPEAKER BY USING SMART GLASSES

CROSS-REFERENCE TO RELATED APPLICATION

This application claims priority to and the benefit of Korean Patent Application No. 10-2017-0172442, filed on Dec. 14, 2017, the disclosure of which is incorporated herein by reference in its entirety.

BACKGROUND

1. Field of the Invention

The present invention relates to an apparatus and method for selecting a speaker by using smart glasses, and more particularly, to an apparatus and method for selecting a speaker by using smart glasses in which automatic interpretation may be performed through a natural interface when several people talk with each other in different languages such as in a meeting.

2. Discussion of Related Art

A related art suggested methods of interpreting a conversation by using mobile devices between only two people.

In particular, a method of interpreting a conversation between two people who are talking over the phone through the public switched telephone network (PSTN) is being put into general use.

Meanwhile, in a hands-free automatic interpretation method of a mobile device which was previously applied for patent, a method of naturally connecting persons who face each other by using short-range wireless communication was suggested.

Here, three or more people are allowed to be connected and use the method. However, since there is neither a clarified method of changing speakers nor a clarified sequence of speakers, people may speak at the same time.

Also, since the people participating in the conversation are connected in an N-to-N fashion so that languages of the people should be recognized and interpreted into all the languages, excessive costs are required for a system.

In addition, since connections of multiple users are attempted through intensity measurement of a short-range network, accuracy in interlocutor connection may be degraded due to crosstalk when many people use similar kinds of short-range communication.

SUMMARY OF THE INVENTION

The present invention is directed to providing an apparatus and method for selecting a speaker by using smart glasses in which when a conversation of several people is interpreted, an interlocutor is correctly connected through a natural interface and resource consumption of an interpretation system is reduced.

Objectives of the present invention is not limited those mentioned above, and other objects will be apparent to those or ordinary skill in the art from the description below.

According to an aspect of the present invention, there is provided an apparatus for selecting a speaker by using smart glasses, the apparatus including: a camera configured to capture a front angle video of a user and track guest interpretation interlocutors in the captured video; smart glasses configured to display a virtual space map image including the guest interpretation interlocutors tracked through the camera; a gaze-tracking camera configured to select a target person for interpretation by tracking a gaze of the user so that a guest interpretation interlocutor displayed in the video may be selected; and an interpretation target processor configured to provide an interpretation service in connection with the target person selected through the gaze-tracking camera.

According to another aspect of the present invention, there is provided a method of selecting a speaker by using smart glasses, the method including: capturing, by a camera, a front angle video of a user and tracking guest interpretation interlocutors in the captured video; generating, by smart glasses, a virtual conversation space for interpreted conversation with the guest interpretation terminals of the tracked interlocutors; tracking, by a gaze-tracking camera, movement of black pupils in the user's eyes to estimate a gaze direction of the user and select a target terminal for interpretation; and performing, by an interpretation target processor, interpretation in connection with the target terminal for interpretation selected through the gaze-tracking camera.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Inventive advantages, features, and methods of accomplishing the same will become apparent with reference to embodiments described in detail below together with the accompanying drawings. However, the present invention is not limited by embodiments disclosed hereinafter, and may be implemented in various forms. Rather, these embodiments are provided so that this disclosure will be thorough and complete and will fully convey the concept of the invention to those of ordinary skill in the art. The present invention is only defined by the appended claims. Meanwhile, the terminology used herein is for the purpose of describing embodiments only and is not intended to limit the present invention. As used herein, singular terms are intended to include the plural forms as well unless the context clearly indicates otherwise. It will be further understood that the terms "comprises" and/or "comprising", when used herein, do not preclude the presence or addition of one or more elements, steps, operations, and/or devices other than stated elements, steps, operations, and/or devices.

Figure 1:
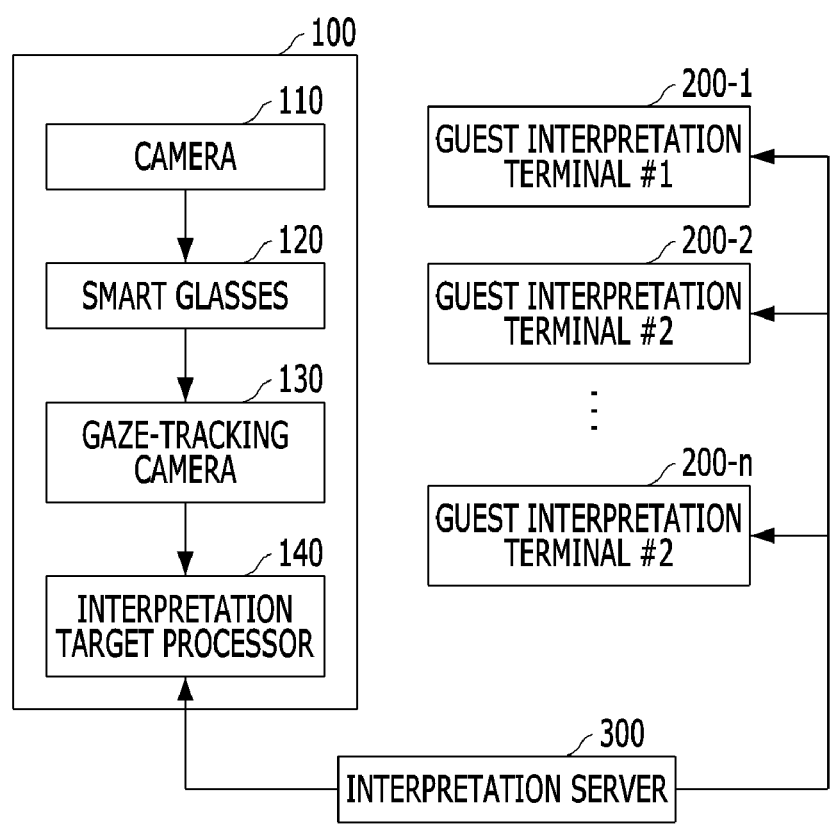
FIG. 1 is a functional block diagram of an apparatus for selecting a speaker by using smart glasses according to an exemplary embodiment of the present invention.

Hereinafter, exemplary embodiments of the present invention will be described in detail with reference to the accompanying drawings. FIG. 1 is a functional block diagram of an apparatus for selecting a speaker by using smart glasses according to an exemplary embodiment of the present invention.

Figure 2:
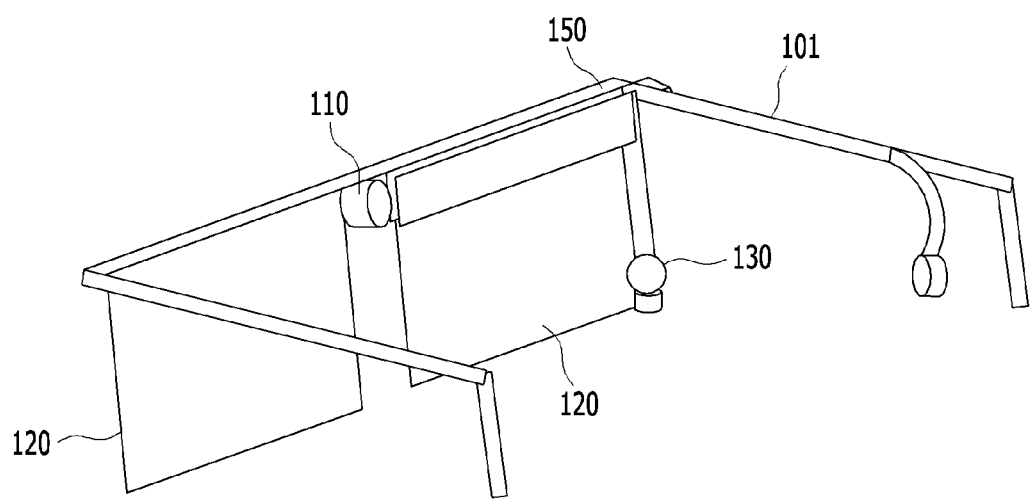
FIG. 2 is a perspective view of smart glasses according to an exemplary embodiment of the present invention.

As shown in FIG. 1, the apparatus for selecting a speaker by using smart glasses according to an exemplary embodiment of the present invention includes a camera 110, smart glasses 120, a gaze-tracking camera 130, and an interpretation target processor 140. As shown in FIG. 2, smart glasses employed in an exemplary embodiment of the present invention includes a support 101.

The camera 110 serves to capture a front angle video of a wearer and track guest interpretation interlocutors in the captured video. The camera 110 may be positioned in the middle of the smart glasses 120 to capture a front angle of the wearer.

Figure 3:
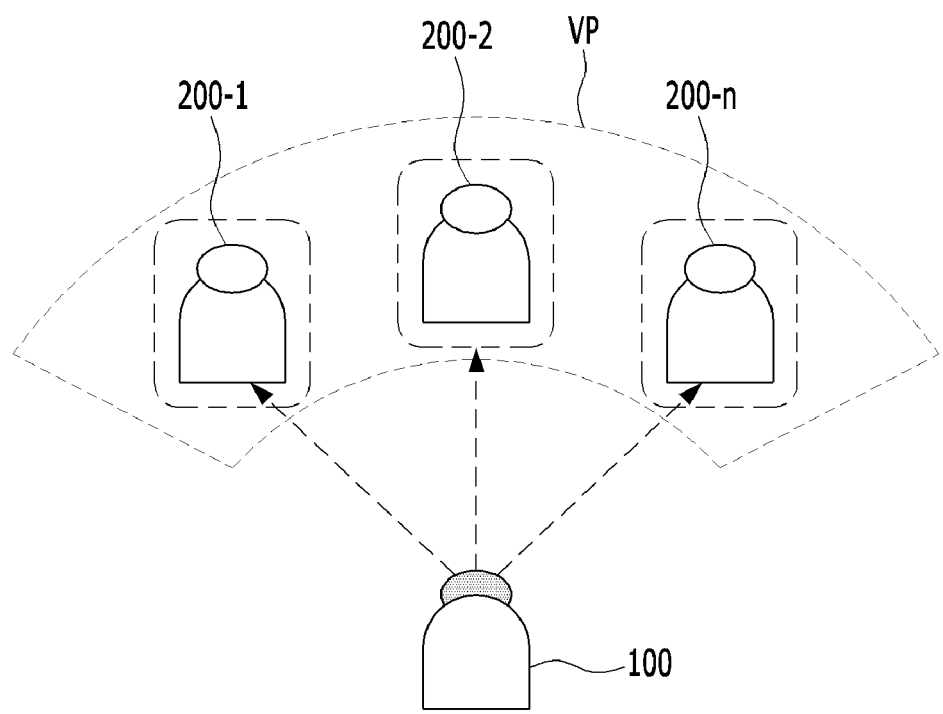
FIG. 3 is a diagram showing a state in which an apparatus for selecting a speaker by using smart glasses according to an exemplary embodiment of the present invention is used.
Figure 4:
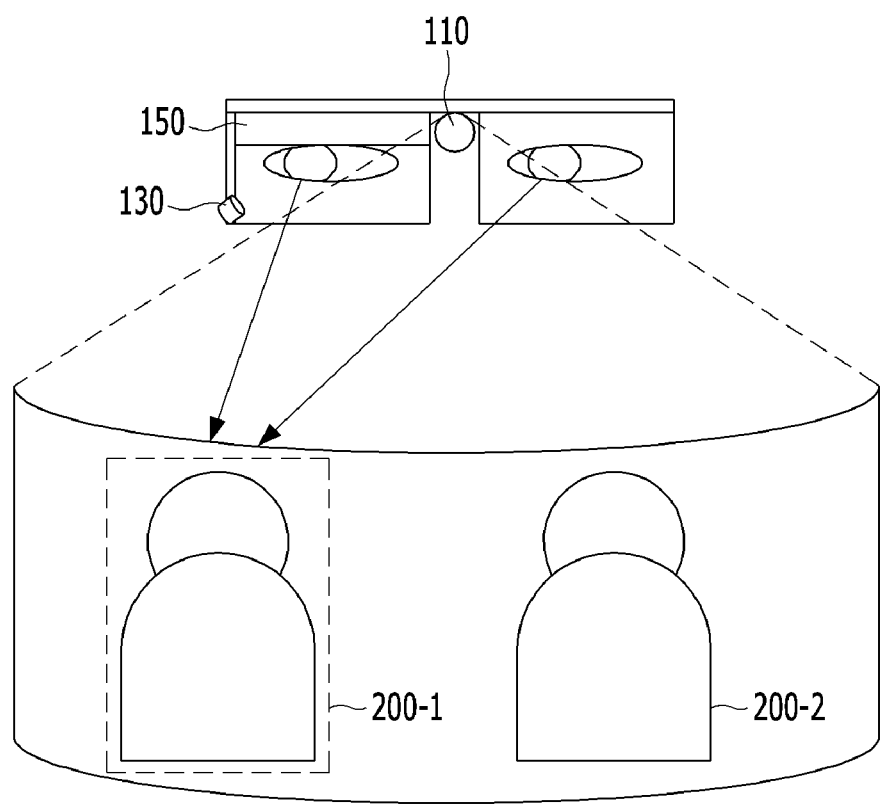
FIG. 4 is a diagram illustrating a process of selecting a guest interpretation interlocutor on the basis of a gaze by using an apparatus for selecting a speaker by using smart glasses according to an exemplary embodiment of the present invention.

The smart glasses 120 may serve to display the guest interpretation interlocutors tracked through the camera 110 in a video of a virtual space map VP. In other words, as shown in FIG. 3 the smart glasses 120 displays tracked guest interpretation interlocutors 200-1 to 200-n in the virtual space map VP.

The gaze-tracking camera 130 serves to select a target person for interpretation by tracking a gaze of the wearer so that a guest interpretation interlocutor displayed in the video may be selected. The gaze-tracking camera 130 is installed on one side of the smart glasses 120 and provides information for calculating a gaze angle of the wearer by tracking movement of eyes of the wearer.

Figure 7:
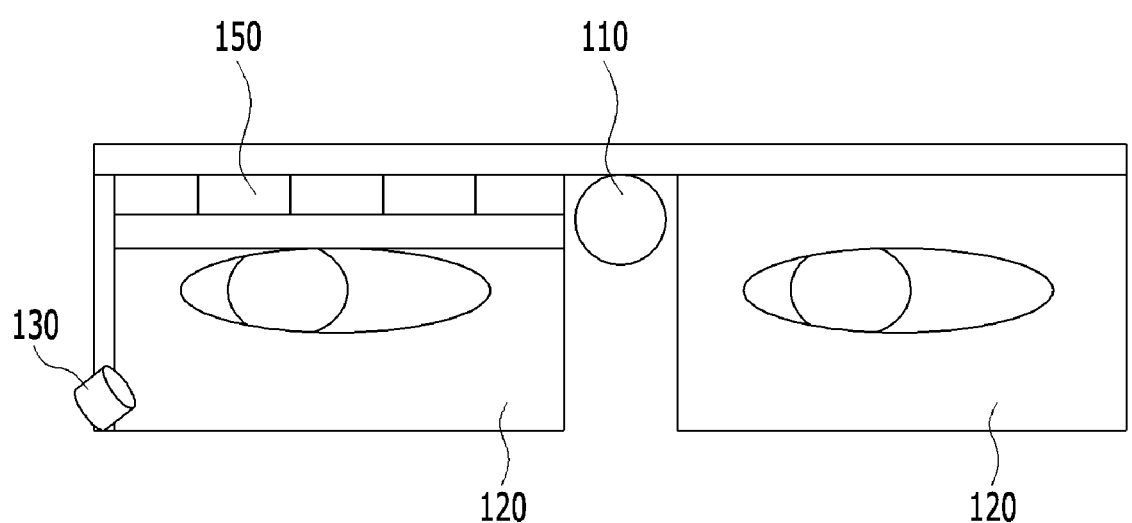
FIG. 7 is a reference diagram showing a state in which a color barcode is displayed in an apparatus for selecting a speaker by using smart glasses according to an exemplary embodiment of the present invention.

Here, as shown in FIG. 7, the gaze-tracking camera 130 tracks which part of a front side the wearer is looking at on the basis of the gaze angle of the wearer and selects a guest interpretation interlocutor that the wearer's gaze reaches by using the part of the front side that the wearer is looking at.

The interpretation target processor 140 serves to provide an interpretation service in connection with the target person selected through the gaze-tracking camera 130. Also, the interpretation target processor 140 may provide information on the guest interpretation interlocutors displayed in the virtual space map VP of the smart glasses 120 to an interpretation server 300.

Setting of a speech mode and an interpretation mode in the apparatus for selecting a speaker by using smart glasses according to an exemplary embodiment of the present invention will be described below.

First, a host interpretation terminal 100 and a selected guest interpretation terminal 200 are set to one of a speech mode in which a user may speak in his or her native language and an interpretation mode in which while a partner of conversation speaks, the user waits and receives an interpreted information of a speech made in a native language of the interlocutor. It is preferable to set by default the host interpretation terminal 100, which has the right of a chairperson, to the speech mode and the guest interpretation terminals 200 to the interpretation mode.

Here, users are classified into a host and guests in order to enable many people to clearly and sequentially have a conversation. With regard to who will be allowed to speak when speakers are changed, the right of a chairperson is given to the host interpretation terminal 100, thereby overcoming a difficulty in interpretation caused by simultaneous speeches.

Figure 5:
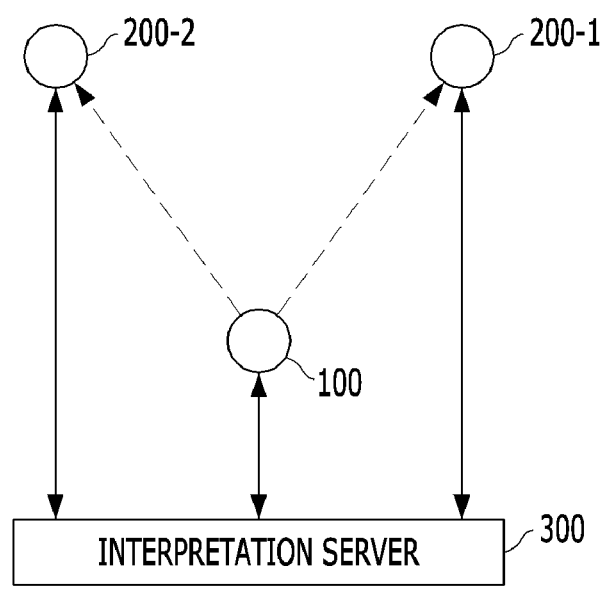
FIG. 5 is a functional block diagram illustrating a configuration of connections among a host interpretation terminal and guest interpretation terminals according to an exemplary embodiment of the present invention.

As shown in FIG. 5, all of N participants may be connected to each other in an N-to-N fashion and interpreted on the basis of a language of the host interpretation terminal 100 such that overload may be removed from the interpretation server 300 and one-to-one interpretation and one-to-N interpretation may be possible.

FIG. 5 is a functional block diagram illustrating a configuration of connections among a host interpretation terminal and guest interpretation terminals according to an exemplary embodiment of the present invention.

As shown in FIG. 5, since interpretation is performed on the basis of the language of the host interpretation terminal 100, a speech made through a guest interpretation terminal 200-1 is interpreted into the language of the host interpretation terminal 100 and transferred to the host interpretation terminal 100, and is again interpreted into a language of a guest interpretation terminal 200-2 and transferred to the guest interpretation terminal 200-2. In other words, continuous interpretation is performed in a one-to-one fashion.

A speech made through the host interpretation terminal 100 is simultaneously interpreted into languages of the guest interpretation terminal 200-1 and the guest interpretation terminal 200-2 and transferred. In other words, interpretation is performed in a one-to-N fashion.

Here, since the respective user devices are connected online to the interpretation server 300, it is possible to transfer a speech made through each user device to the interpretation server 300 and receive interpreted synthetic sound and text as shown in a configuration of the virtual conversation space map VP.

When the number of participants is small such as three, N-to-N interpretation is possible. However, when the number of participants increases, the number of languages to be paired considerably increases, and the system may be overloaded.

Users have the speech mode in which it is possible to speak in their native languages and the interpretation mode in which while an interlocutor speaks, the users wait and receive interpreted information of a speech of the interlocutor.

If not in the speech mode, all users wait in the interpretation mode by default. The host interpretation terminal 100 may switch to the speech mode when a user thereof wants the speech mode, and has the right to place the guest interpretation terminal 200 in the speech mode. The guest interpretation terminal 200 is switched to the speech mode by the host interpretation terminal 100, and is switched to the interpretation mode when a speech is finished.

Figure 6A:
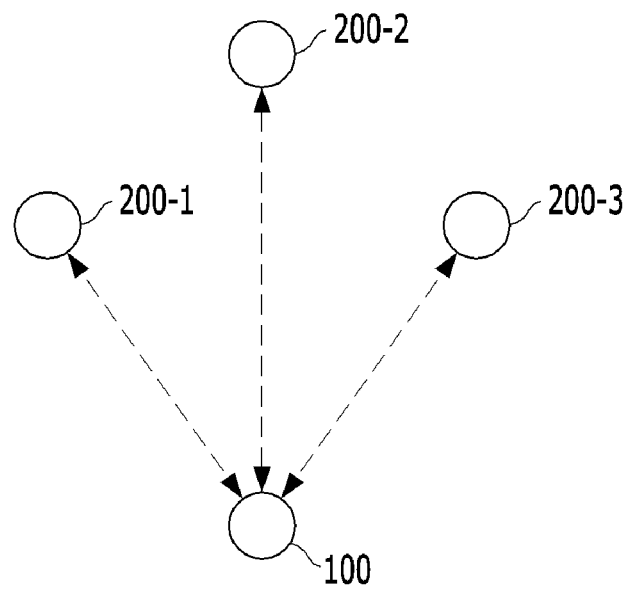
FIGS. 6A and 6B are diagrams illustrating a structure of connections among a host interpretation terminal and guest interpretation terminals according to an exemplary embodiment of the present invention.
Figure 6B:
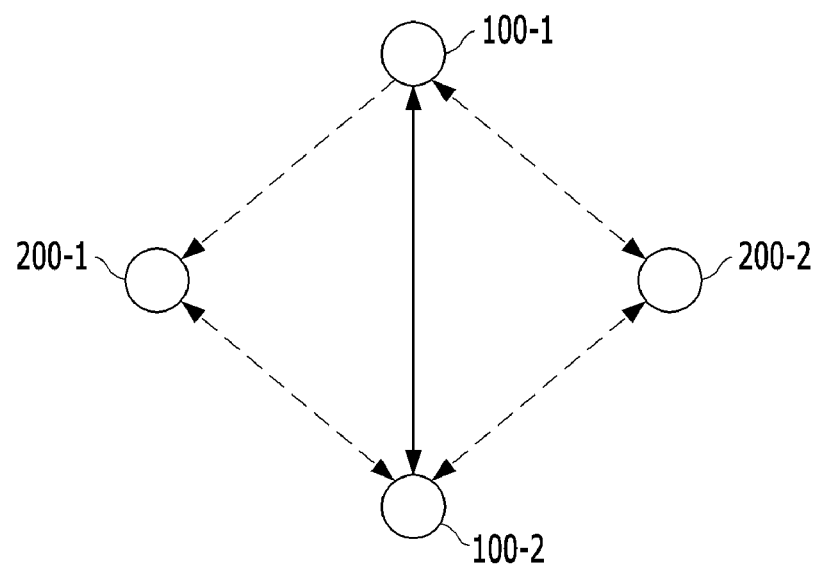

FIGS. 6A and 6B are diagrams illustrating a structure of connections among a host interpretation terminal and guest interpretation terminals according to an exemplary embodiment of the present invention.

As for user connections, several guest interpretation terminals 200-1 to 200-3 may be connected to one host interpretation terminal 100 as shown in FIG. 6A, or several guest interpretation terminals 200-1 and 200-2 may be connected to two host interpretation terminals 100-1 and 100-2 as shown in FIG. 6B.

According to the configuration composed of the plurality of host interpretation terminals 100-1 and 100-2, when the host interpretation terminal 100-1 creates a conversation space, the host interpretation terminal 100-2 which has been set to another host participates in the conversation space and shares the right of a host as shown in FIG. 6B.

In this method, the host interpretation terminals 100 equally sharing the right are present in respective two groups which participate in a meeting. The host interpretation terminals 100 may be placed in the speech mode any time, whereas the guest interpretation terminals 200 may be placed in the speech mode when the two host interpretation terminals 100 agree.

When all of the four users use different languages, a speech made through the host interpretation terminal 100-1 or 100-2 is simultaneously interpreted into three languages and separately transferred to the other interpretation terminals 100-1 or 100-2, 200-1, and 200-2.

When the guest interpretation terminal 200-1 or 200-2 participates in the conversation space, a speech is interpreted on the basis of the host interpretation terminal 100-1 or 100-2 selected by the guest interpretation terminal 200-1 or 200-2 and transferred to the other people. In other words, when the guest interpretation terminal 200-1 is connected to the host interpretation terminal 100-2 to participate in the conversation, the guest interpretation terminal 200-1 interprets a speech and transfers the interpreted speech to the host interpretation terminal 100-2, and the host interpretation terminal 100-2 interprets the interpreted speech into respective languages and transfers the interpreted speeches to the other users.

An actual task is performed in the interpretation server 300. As shown in the configuration of the generated virtual conversation space map VP, language pairs to be interpreted are generated in the interpretation server 300, and interpreted synthetic sound and text is transferred to the corresponding user devices.

According to an exemplary embodiment of the present invention, it is possible to provide a method of clearly changing speakers among a plurality of people by a host interpretation interlocutor by tracking guest interpretation interlocutors in a video through the camera 110, connecting the guest interpretation interlocutors in the video to the virtual conversation space map VP, and designating a guest in the virtual conversation space map VP as a speaker whose speech will be interpreted through the gaze-tracking camera 130.

Also, according to an exemplary embodiment of the present invention, the host interpretation terminal 100 selects a speaker whose speech will be interpreted by monitoring a gaze of a user thereof. Therefore, the interpretation server 300 is not overloaded by N-to-N interpretation in which all of N participants are connected to each other, and interpretation is performed in a one-to-one fashion or a one-to-N fashion.

Meanwhile, the interpretation server 300 receives user identity (ID) information of the host interpretation terminal 100 and user ID information of the guest interpretation terminals 200-1 to 200-*n* displayed in the virtual conversation space map VP from the host interpretation terminal 100 and manages the received user ID information in combination with each other.

Therefore, the interpretation server 300 interprets a speech made through a guest interpretation terminal 200 of a guest interpretation interlocutor selected through the gaze-tracking camera 130 of the host interpretation terminal 100 among guest interpretation interlocutors displayed in the virtual conversation space map VP and provides the interpreted speech to the host interpretation terminal 100. Speeches made through the other guest interpretation terminals 200 are not interpreted and on standby to be processed.

When the host interpretation terminal 100 selects another guest interpretation interlocutor according to a gaze of the host interpretation interlocutor, the interpretation server 300 provides an opportunity to speak to the other guest interpretation interlocutor.

FIG. 7 is a diagram illustrating a color barcode provided in smart glasses employed in an exemplary embodiment of the present invention. As shown in FIG. 7, the smart glasses 120 employed in an exemplary embodiment of the present invention may display a color barcode 150 which shows a host ID including language information of an interlocutor.

When interpretation interlocutors display color barcodes in their smart glasses 120 in this way, a host interpretation interlocutor may select a guest interpretation interlocutor through the camera 110.

Therefore, the host interpretation interlocutor may select a guest interpretation terminal 200 through the host interpretation terminal 100 without using a hand.

Meanwhile, the smart glasses 120 may output a color barcode on a front side as shown in FIG. 7.

When a color barcode is recognized, the camera 110 may acquire user ID information of a partner of interpreted conversation and connect to a target terminal for interpreted conversation.

Meanwhile, in a host state, the interpretation target processor 140 may give an opportunity to speak to a guest interpretation interlocutor selected through the gaze-tracking camera 130 from among guest interpretation interlocutors displayed in the smart glasses 120.

Also, the smart glasses 120 may display interpreted text in real time. The smart glasses 120 may output the interpreted text on a back side.

Figure 8:
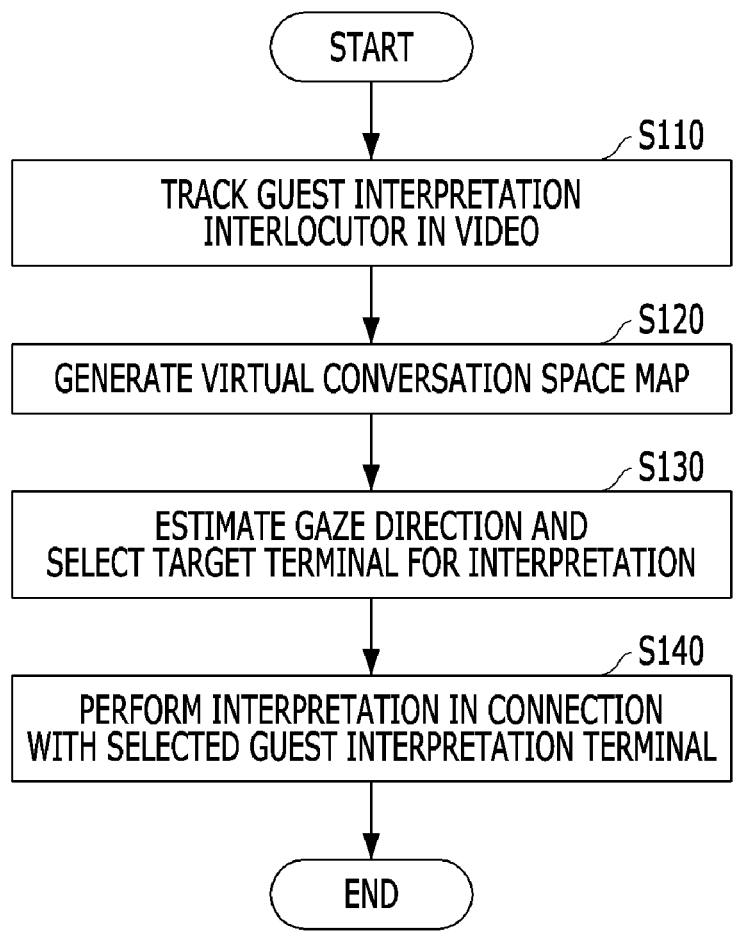
FIG. 8 is a flowchart illustrating a method of selecting a speaker by using smart glasses according to an exemplary embodiment of the present invention.

FIG. 8 is a flowchart illustrating a method of selecting a speaker by using smart glasses according to an exemplary embodiment of the present invention.

As shown in FIG. 8, the method of selecting a speaker by using smart glasses according to an exemplary embodiment of the present invention corresponds to a method for a host interpretation terminal to connect to a guest interpretation terminal 200.

First, the camera 110 captures a front angle video of a user and tracks guest interpretation interlocutors in the captured video (S110). To this end, the guest interpretation interlocutors may wear the guest interpretation terminals 200.

Then, the smart glasses 120 generates a virtual conversation space map VP for an interpreted conversation with the guest interpretation terminals 200 of the tracked interlocutors (S120). When the virtual conversation space map VP including the guest interpretation interlocutors equipped with the guest interpretation terminals 200 is generated in the smart glasses 120, a host interpretation interlocutor may select a guest interpretation interlocutor whose speech will be interpreted by gazing at the guest interpretation interlocutor.

Subsequently, the gaze-tracking camera 130 tracks movement of black pupils in the user's eyes to estimate a gaze direction of the user and select a target terminal for interpretation (S130). In other words, the gaze-tracking camera 130 may select a target terminal for interpretation when the host interpretation interlocutor simply gazes at a guest interpretation interlocutor generated in the virtual conversation space map VP for a preset time period.

Then, the interpretation target processor 140 performs interpretation in connection with the guest interpretation terminal selected through the gaze-tracking camera 130 (S140). In other words, the interpretation target processor 140 selects a guest interpretation interlocutor whose speech will be interpreted through the gaze-tracking camera 130.

Accordingly, the host interpretation terminal 100 and the selected guest interpretation terminal 200 are placed in the speech mode in which a user may speak in his or her native language and the interpretation mode in which while an interlocutor speaks, a user waits and receives interpreted information of a speech made in a native language of the interlocutor.

Therefore, the host interpretation terminal 100 provides a speech of the host interpretation interlocutor to the interpretation server 300 so that the speech made by the host interpretation interlocutor may be interpreted through the interpretation server 300.

Then, the interpretation server 300 interprets the original speech provided by the host interpretation terminal 100 and then provides the interpreted speech to the guest interpretation terminal 200. Here, information provided by the host interpretation terminal 100 to the interpretation server 300 may be information on the guest interpretation terminal 200 which has been selected as a target for speaking.

Meanwhile, the guest interpretation terminal 200 is selected through the gaze-tracking camera 130 of the host interpretation terminal 100 while being displayed in the virtual conversation space map VP by the host interpretation terminal 100 such that a speech of the guest interpretation interlocutor made through the guest interpretation terminal 200 may be interpreted and provided to the host interpretation terminal 100.

When no speech is interpreted by the host interpretation terminal 100, even if the guest interpretation interlocutor makes a speech through the guest interpretation terminal 200, the speech is not interpreted by the interpretation server 300.

In the operation of generating the virtual conversation space map VP (S120), a block corresponding to a position of a guest interpretation interlocutor may be designated in the virtual conversation space map VP and connected to an ID of the guest interpretation interlocutor.

In the operation of tracking the guest interpretation interlocutor in the video (S110), when a color barcode is recognized, the camera 110 may acquire user ID information of the partner of interpreted conversation and connect to a target terminal for interpreted conversation.

In the operation of performing interpretation (S140), the interpretation target processor 140 in a host state may give an opportunity to speak to the interlocutor selected through the gaze-tracking camera 130 from among guest interpretation interlocutors displayed in the smart glasses 120.

In the operation of performing interpretation (S140), when interpretation is performed in connection with the guest interpretation terminal, the interpretation target processor 140 may perform interpretation into a host language.

In the operation of performing interpretation (S140), the smart glasses 120 may display interpreted text in real time on a back side.

In the operation of performing interpretation (S140), the interpretation target processor 140 may apply different voices to respective guest interpretation terminals 200 of selected interlocutors. In this way, in the operation of performing interpretation (S140), an interpretation service is provided to guest interpretation terminals 200 through different voices such that respective guest interpretation interlocutors may be clearly distinguished from each other.

According to an exemplary embodiment of the present invention, a color barcode displayed through smart glasses is provided such that a connection for an interpreted conversation can be made simply by looking at each other when two people are away from each other within a distance at which it is possible to identify each other using a camera. Accordingly, an interpreted conversation can be performed at a considerable distance such as in the case of a lecturer and a hearer in a lecture.

Also, according to an exemplary embodiment of the present invention, even when a host interpretation interlocutor simply gazes at a guest interpretation interlocutor who wears the same smart glasses, interpretation of a speaker can be provided. Therefore, it is possible to easily select a speaker and provide an interpretation service in connection with the speaker.

An embodiment of the present invention may be implemented in a computer system, e.g., as a computer readable medium.

Figure 9:
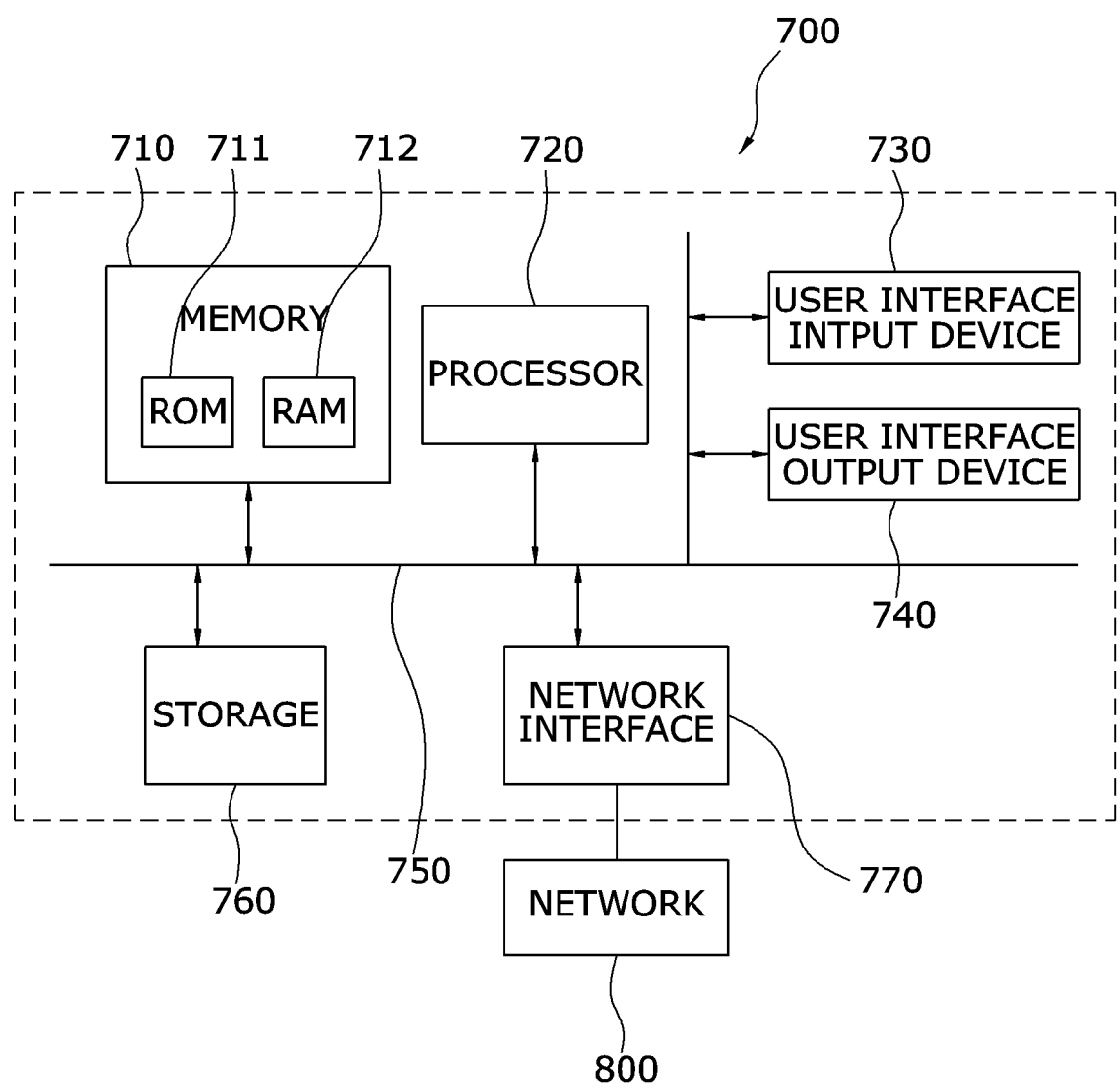
FIG. 9 is a block diagram illustrating a computer system to which the present invention is applied.

FIG. 9 is a block diagram illustrating a computer system to which the present invention is applied.

As shown in FIG. 9, a computer system 700 may include one or more of a processor 710, a memory 730, a user input device 740, a user output device 750, and a storage 760, each of which communicates through a bus 720. The computer system 700 may also include a network interface 770 that is coupled to a network 800. The processor 710 may be a central processing unit (CPU) or a semiconductor device that executes processing instruction stored in the memory 730 and/or the storage 760. The memory 730 and the storage 760 may include various forms of volatile or non-volatile storage media. For example, the memory 730 may include a read-only memory (ROM) 731 and a random access memory (RAM) 732.

Accordingly, an embodiment of the invention may be implemented as a computer implemented method or as a non-transitory computer readable medium with computer executable instruction stored thereon. In an embodiment, when executed by the processor, the computer readable instruction may perform a method according to at least one aspect of the invention.

Exemplary embodiments of the present invention have been described above. Those of ordinary skill in the art would appreciate that the present invention can be implemented in modified forms without departing from the fundamental characteristics of the present invention. Therefore, exemplary embodiments of the present invention should be construed as describing rather than limiting the present invention. It should be noted that the scope of the present invention is defined by the claims rather than the description of the present invention, and the meanings and ranges of the claims and all modifications derived from the concept of equivalents thereof fall within the scope of the present invention.

What is claimed is:

1. An apparatus for selecting a speaker by using smart glasses, the apparatus comprising:
a front angle camera configured to capture a front angle video of a user and track guest interpretation interlocutors in the captured video;

smart glasses configured to display a virtual space map image including the guest interpretation interlocutors tracked through the front angle camera;

a gaze-tracking camera configured to select a target person for interpretation by tracking a gaze of the user so that one of the guest interpretation interlocutors displayed in the video is selected; and an interpretation target processor configured to provide an interpretation service in connection with the target person selected through the gaze-tracking camera, wherein the smart glasses display a color barcode showing a host identity (ID) including language information of the user.

2. The apparatus of claim 1, wherein the smart glasses output the color barcode on a front side thereof.

3. The apparatus of claim 1, wherein when a color barcode is recognized by the front angle camera, the interpretation target processor acquires user ID information of a partner of interpreted conversation and connects the user ID information to a target terminal for interpreted conversation.

4. The apparatus of claim 1, wherein the interpretation target processor in a host state selects a corresponding guest interpretation terminal so that an opportunity to speak is given to the interlocutor selected through the gaze-tracking camera from among the guest interpretation interlocutors displayed in the smart glasses.

5. The apparatus of claim 1, wherein the smart glasses display interpreted text in real time.

6. The apparatus of claim 5, wherein the smart glasses output the interpreted text on a back side.

7. A method of selecting a speaker by using smart glasses, the method comprising:

capturing, by a front angle camera, a front angle video of a user and tracking guest interpretation interlocutors in the captured video, the tracking including recognizing a color barcode showing a host identity (ID) including language information of the user;

generating, by smart glasses, a virtual conversation space for interpreted conversation with guest interpretation terminals of the tracked interlocutors;

tracking, by a gaze-tracking camera, movement of black pupils in the user's eyes to estimate a gaze direction of the user and select a target terminal for interpretation; and performing, by an interpretation target processor, interpretation in connection with the target terminal for interpretation selected through the gaze-tracking camera.

8. The method of claim 7, wherein the generating of the virtual conversation space comprises designating blocks corresponding to positions of the guest interpretation interlocutors in a virtual space map and connecting the blocks to identities (IDs) of the guest interpretation interlocutors.

9. The method of claim 8, wherein the tracking of the guest interpretation interlocutors in the captured video comprises, when a color barcode is recognized, acquiring, by the front angle camera, user ID information of a partner of interpreted conversation and connecting the user ID information to a target terminal for interpreted conversation.

10. The method of claim 7, wherein the performing of the interpretation comprises selecting, by the interpretation target processor in a host state, a corresponding guest interpretation terminal so that an opportunity to speak is given to an interlocutor selected through the gaze-tracking camera from among the guest interpretation interlocutors displayed in the smart glasses.

11. The method of claim 7, wherein the performing of the interpretation comprises performing, by the interpretation target processor, interpretation into a language of a host in connection with the target terminal for interpretation.

12. The method of claim 11, wherein the performing of the interpretation further comprises displaying, by the smart glasses, interpreted text in real time.

13. The method of claim 12, wherein the performing of the interpretation further comprises displaying, by the smart glasses, the interpreted text on a back side.

14. The method of claim 11, wherein the performing of the interpretation further comprises performing, by the interpretation target processor, interpretation by applying different voices to respective guest interpretation terminals of selected interlocutors.

\* \* \* \* \*